Figure 1:
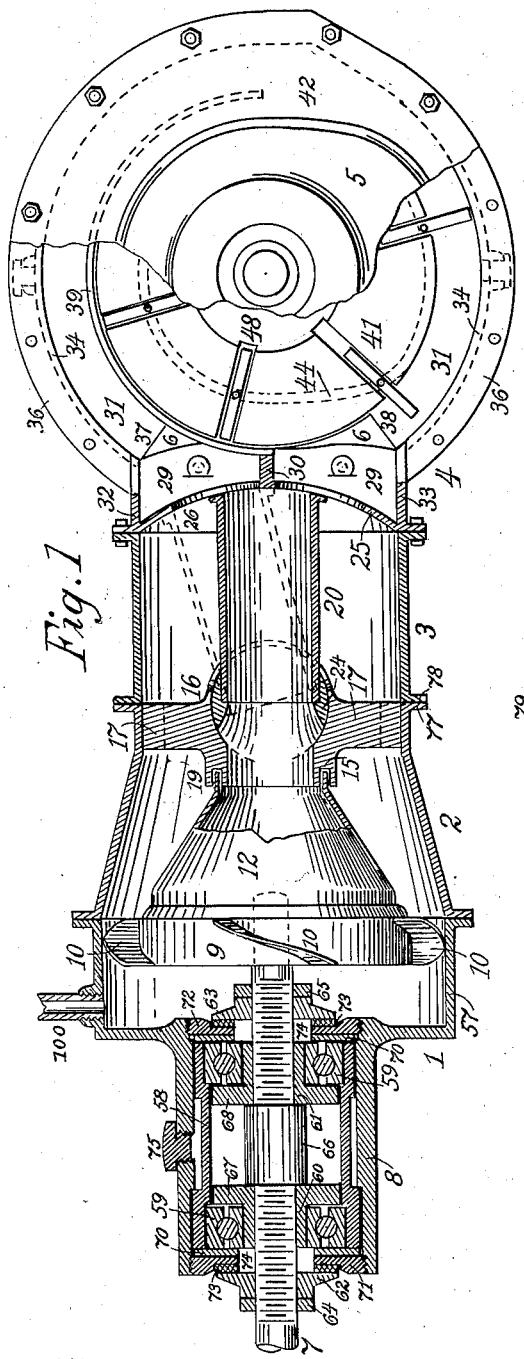

M. C. KRARUP.
POWER TRANSMISSION MECHANISM.
APPLICATION FILED JULY 11, 1906.

1,039,963. Patented Oct. 1, 1912.

2 SHEETS—SHEET 1.

Witnesses
Frank N. Clark
John Keffer

Inventor
Marius C. Krarup

M. C. KRARUP.
POWER TRANSMISSION MECHANISM.
APPLICATION FILED JULY 11, 1906.
1,039,963.
Patented Oct. 1, 1912.
2 SHEETS—SHEET 2.
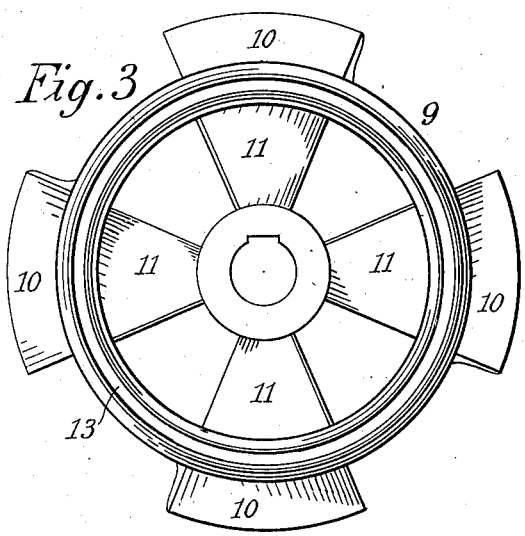
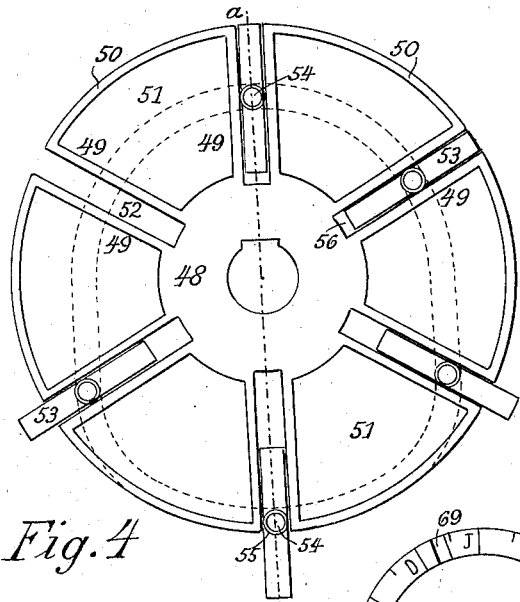
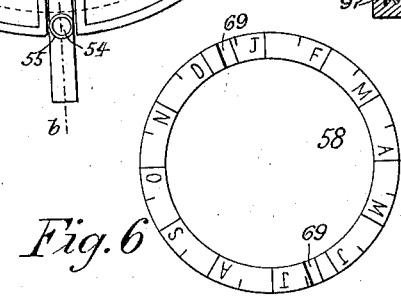
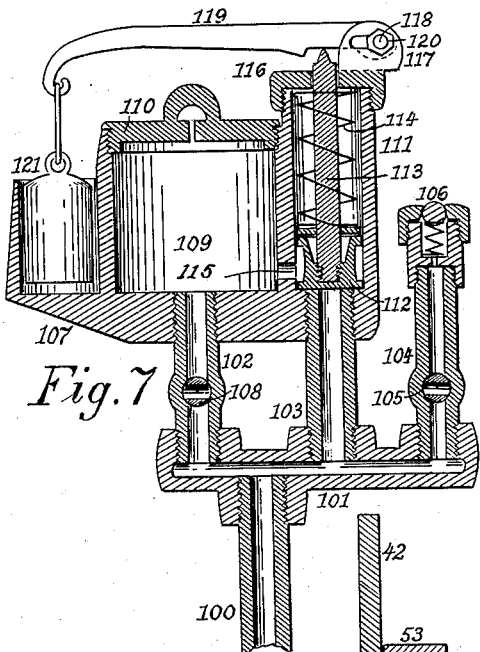
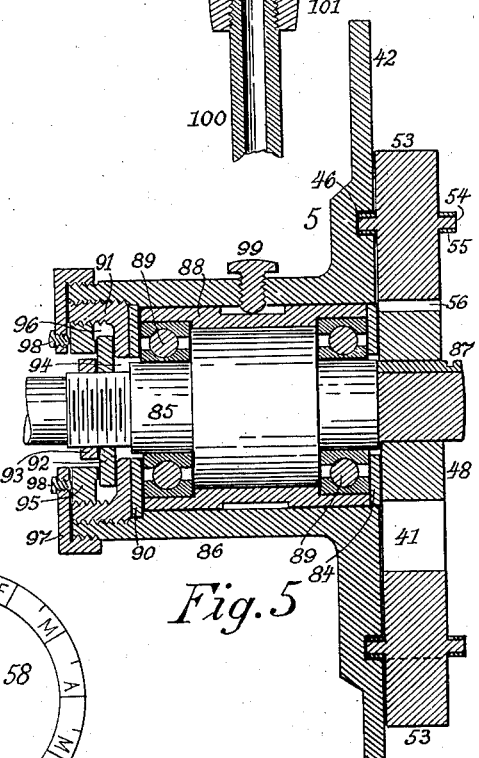
Witnesses
Frank H. Clark
John Koffer
Inventor
Marius C. Krarup

UNITED STATES PATENT OFFICE.

MARIUS C. KRARUP, OF BROOKLYN, NEW YORK.

POWER-TRANSMISSION MECHANISM.

1,039,963.  Specification of Letters Patent.  Patented Oct. 1, 1912.

Application filed July 11, 1906. Serial No. 325,653.

*To all whom it may concern:*

Be it known that I, MARIUS C. KRARUP, a citizen of the United States, residing at Brooklyn, in the county of Kings and State of New York, have invented a new and useful Power-Transmission Mechanism, of which the following is a specification.

My invention relates to improvements in the means for transmitting power from a driving shaft to one or more driven shafts by the operation of an intermediate mechanism serving to vary, at the will of the operator, the ratio between the rotary speed of the driving shaft and the rotary speed or speeds of driven shafts.

It relates, more particularly, to improvements in hydraulic power transmission mechanisms by which any desired portion of the power delivered from an engine shaft, or driving shaft, may be transmitted to driven shafts, the unused portion of the power, in each case, being dissipated in the operation of the mechanism.

The objects and usefulness of my invention are most readily understood by a statement of the disadvantages in previous power transmission mechanisms which are removed when my invention is applied.

In transmitting power by mechanical means from the shaft of an internal-combustion engine it has heretofore, excepting some forms of marine work, been necessary to employ one or more friction clutches, or couplings, and it has been desirable to have several sets of transmission gears, in order to be able to vary the speed ratio between driving-shaft and driven shafts. The disadvantages arising from this arrangement, and avoided by means of my invention, may be enumerated, as follows: A friction clutch is (1) subject to rapid wear, whereby the nature of its action is rendered changeable and uncertain. The engine (2) must be started while the clutch is released and (3) is often thereby caused to run idle at great velocity, to its detriment. The gears (4) wear rapidly and become wasteful of power and noisy in action. As each set of transmission gears represents a certain ratio between the speeds of the driving and the driven shafts, (5) increased resistance may overload the engine and bring it to an unintentional stop. The employment of internal-combustion engines for work offering many and irregular variations of resistance to the driving-power and necessitating many variations in the speed of driven shafts, has therefore (6) required much skill and watchfulness on the part of the operator; and (7) expensive construction and workmanship have been necessary in order to minimize the aforesaid disadvantages. It has also been a disadvantage that (8) the motive power could not be utilized to stop the work without risking a stoppage of the engine, and, in the case of motor vehicles, this condition has necessitated the (9) extensive employment and frequent use of friction brakes for retarding the momentum of the vehicles, and (10) these brakes have required frequent adjustment and replacement of parts and usually (11) a considerable physical exertion for their operation. In motor vehicles driven from internal-combustion engines it has also (12) been found difficult to cause an engine which is powerful enough for drawing heavy loads to run slowly enough for practical traffic purposes when the vehicle is unloaded, without much injurious vibration of the vehicle or excessive wear on clutches or brakes. When internal-combustion engines have been used for the propulsion of railway coaches, it has been found (13) a serious objection to the mechanical power transmission mechanisms heretofore in use that the operative motions were relatively complicated and the reliability of operation impaired by a large number of wearing parts gradually deteriorating by use and necessitating frequent and very close inspection to secure dependability of service. With the various mechanical power transmission mechanisms heretofore in use it has been found (14) impracticable to transmit power to driven shafts not either parallel with the driving shaft or, substantially, at right angles with the driving shaft. It has also been found (15) impracticable to use kerosene or alcohol as fuel in internal-combustion engines for portable or other work requiring a "flexible power."

The objects of my invention are, first, to remove all of the aforesaid disadvantages heretofore attaching to the use of mechanical power transmission mechanisms in conjunction with internal-combustion engines; second, to provide a simple mechanism adapted for use in the distribution of power from a main shaft, driven by steam or other power, to machine tools, and for other work in which it may be desirable not only to vary the speed but also to limit the power behind the speed over a continuous range from zero to maximum. I attain these objects by the hydraulic mechanism illustrated in the accompanying drawings.

In hydraulic mechanisms intended for relatively light and rapid work it has heretofore been an obstacle to success that, after a comparatively short period of operation, the efficiency of such mechanisms was reduced or destroyed by leakage of the fluid contained in them, the leakage being caused either by excessive pressure due to expansion or contraction of the materials of the mechanism and the absence of provisions for relieving such pressure, or, by the bearings of shafts and pistons becoming loose and leaky from wear.

It is an additional object of my invention to remove these disadvantages which have militated against previous hydraulic mechanisms, and I attain this object particularly by the bearings for rapidly revolving shafts illustrated in the accompanying drawings, and by the use of an auxiliary device for relieving excessive pressure, also illustrated in the accompanying drawings.

Figure 2:
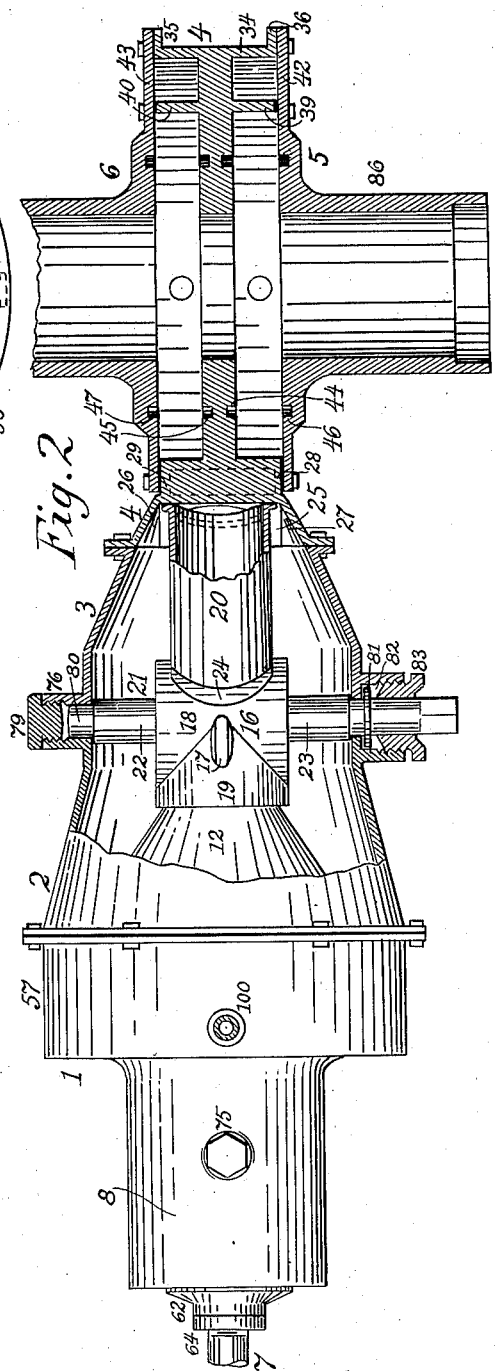

In these drawings—Figure 1 is a side view, partly in axial vertical section, of the mechanism as a whole, certain portions being broken away in order to disclose other portions and certain details being omitted in order to gain clearness. Fig. 2 is a plan view, partly in axial horizontal section, of the mechanism as a whole, certain portions being broken away in order to disclose other portions and the paddle wheels with shafts and bearings being omitted. Fig. 3 is a rear face view, on a larger scale, of the screw wheel 9 in Fig. 1. Fig. 4 is a side view, on a larger scale, of one of the paddle wheels, showing detail omitted in Fig. 1 and with one paddle removed. Fig. 5 is a side view, partly in vertical axial section of one of the paddle wheel shafts, with bearings and hanger in section, and a sectional view of one of the paddle wheels along the plane $a\ b$ in Fig. 4. Fig. 6 shows a detail of the tubular member 58 in Fig. 1. Fig. 7 is a side view, partly in section, of an auxiliary device designed to relieve the principal mechanism of excessive pressures and for other purposes, as hereinafter described.

Similar numerals refer to similar parts throughout the several views.

The mechanism consists of a container-case; a liquor contained therein (not shown), which may be glycerin, oil or any other preferred fluid; the parts moving the fluid; those directing its flow; those normally moved by the fluid; and the auxiliary device already referred to.

The container-case is formed in two or more sections tightly joined by means of flanged edges and bolts and nuts. In the application of my invention illustrated in the drawings the said container-case is composed of six sections, 1, 2, 3, 4, 5 and 6, each normally made as an integral metal casting. Revoluble shaft 7, adapted to be driven from the engine shaft, enters the front end of the container-case through hanger 8 and bearings described in detail hereinafter and carries, on the end within the container-case, wheel 9 provided with circumferential oblique or screw blades 10 adapted to act upon the liquor in the container-case, when the wheel is revolved, in one direction substantially at right angles with the plane of said wheel, and also provided with spokes 11 (Fig. 3) formed as oblique or screw blades and adapted to act upon the liquor in the opposite direction.

Funnel 12, abutting with its circular front edge against the bottom of annular groove 13 (Fig. 3) formed in the screw wheel rim, separates the two opposite currents of the fluid. The rear edge of said separating-funnel is received in a circular groove, 15, formed in the stationary member 16 which I call the switch base. Said switch base consists of standards 17, secured between pairs of lugs projecting from the upper and lower portions of section 2 of the container-case, as indicated by dotted lines in Fig. 1, and, integral with said standards, a body formed as a transverse hollow cylinder or tube, 18, intersected in front by an annular extension, 19, said annular extension being grooved, as aforesaid, to receive the rear edge of the separating funnel. Said hollow cylinder 18 is pierced in the rear with an oblong opening permitting limited rotation of switch tube 20, hereinafter referred to. Into the transverse cylindrical bore of the switch base the middle portion of switch shaft 21 is snugly but rotatably fitted. Said switch shaft is preferably an integral casting and consists of the said cylindrical middle portion and the two shaft arms 22 and 23, the end portions of which are mounted in hangers formed in the walls of sections 2 and 3 of the container-case, as most clearly shown in Fig. 2 and referred to more in detail hereinafter. The extreme end of shaft arm 23, outside of the container-case, is squared to receive an operating-lever or crank (not shown), which may be of any preferred form adapted for turning the switch shaft and holding it in a given position.

Through the middle, cylindrical portion 24 of the switch shaft there is formed a duct extending from front to rear. The rear portion of this duct is cylindrical and of slightly larger diameter than the front portion, so that an annular shoulder is formed between them. The front portion of the duct is flared at the top and bottom, so that the front opening is oval. One end of switch tube 20 is fitted into the rear portion of the duct, abutting against the said shoulder therein, and is secured against rotation around its own axis by means of a spline, a tight fit or any other preferred means. The other end of the switch tube is formed with a flange and in close conformity to the surface of the curved web 25 which constitutes a portion of the front face of section 4 of the container-case and is designed as a portion of a cylinder of a radius equal to the axial length of the switch tube, the axis of the switch shaft being also the axis of said curved web. In the said web are formed two ports, each adapted to register with the bore of the switch tube, accordingly as the latter is turned up or down by means of the lever operating the switch shaft. From the sides of said curved web 25 the oblique and curved walls 26 and 27 extend forwardly and outwardly, until reaching the vertical plane of the rear flange of section 3 of the container-case, and are there flanged so as to be joined tightly to said rear flange of said section 3; and from the upper and lower rectilinear edges of said curved web 25 flanges likewise extend, integral with the said flanges at the sides, the whole flange being of approximately rectangular conformation, to which the shape of the rear end of section 3 of the container-case corresponds. From the edges of curved web 25 extend rearward the vertical side plates 28 and 29 (Fig. 1 showing plate 28 omitted), which serve merely as flanges for the securing of a tight joint with the cover plate portions of sections 5 and 6 of the container-case. In other applications of my inventions and, particularly, when the paddle wheels are broader, in relation to the diameter of the ports in curved web 25 than represented in the drawing, said side plates 28 and 29 are omitted and the walls 26 and 27 are utilized for securing the required joint, being in such cases plane and parallel instead of curved and diverging.

From the rear of curved web 25, between the ports, extends horizontal web 30, shown in vertical cross section in Fig. 1 and in horizontal section in Fig. 2, connecting curved web 25 integrally with dividing-plate 31, which separates the two paddle wheel chambers, excepting their front portions which communicate jointly with the ports in curved web 25, over and under web 30. Horizontal webs 32 and 33, shown partly in cross-section and partly in side view in Fig. 1, also connect curved web 25 integrally with dividing-plate 31 and, continuing around, and integrally with, its circumference, jointly form the circumferential, enveloping wall 34 of the paddle wheel chambers, said wall being provided with flanges 35 and 36 and, at its top portion with a screw-threaded aperture at each side of the dividing-plate, said apertures serving as air vents when the mechanism is being filled with liquor, but normally being closed with screw-plugs. At the bottom of said wall 34 similar apertures with screw plugs are provided, serving as drains, and the interior ends of the plugs for these drains exactly conform to the inner surface of the paddle chambers, when screwed home, so as to leave no unnecessary vent for liquor when a paddle passes by, as may be fully understood from the description of the paddle wheels given hereinafter.

The contour of the recessed front portion of dividing plate 31 is shown by the radial edges 37 and 38, between which the radius of the plate is reduced to correspond to the radius of the paddle wheels, in order to leave the ports in curved web 25 unobstructed. Semi-circular flanges or ribs 39 and 40 extend from opposite sides of dividing-plate 31. For the sake of clearness an interval is shown in Fig. 1 between the circumference of paddle wheel 41 and the interior surface of flange, or rib, 39. In reality the paddle wheels revolve with their circumferences as nearly as practicable in contact with the semi-circular ribs, and with their sides as nearly as practicable in contact with the dividing-plate, on one side, and cover-plates 42 and 43 of sections 5 and 6 of the container-case, respectively, on the other side. In opposite sides of said dividing-plate are formed guide-grooves 44 and 45, which, in conjunction with similar guide-grooves 46 and 47 in cover-plates 42 and 43, serve to guide the paddles into and out of the paddle wheels, as further explained hereinafter.

From the description of the parts numbered 25 to 43 in the accompanying drawings it will be seen that parts 4, 5 and 6 of the casing, when assembled together with the two paddle wheels, form a channel around the paddle wheels, which channel serves as a conduit for the liquor in the mechanism. Immediately to the rear of curved web 25 the channel takes the form of a chamber in common for both paddle wheels but divided by horizontal web 30 and semicircular ribs 39 and 40 into an upper and a lower portion, while from the said web 30 rearward the whole space is divided vertically into individual channels for each paddle wheel by means of dividing-plate 31, and at the rear each lower portion of the channel communicates freely with the corresponding upper portion. The liquor in the mechanism may be directed into the lower channels through the lower port in curved web 25, or it may be directed into the upper channels through the upper port in said web, according to which port is covered by switch-tube 20. In either case the moving liquor actuates the paddle wheels in the lower channels, as the upper channels are separated from the wheels by ribs 39, 40, but in the first case the impulsion acts from the front and in the second case from the rear, so that the paddle wheels are rotated in one direction or in the opposite direction accordingly as the switch-tube covers the upper or the lower port in curved web 25.

The central circular opening in dividing-plate 31, most clearly shown in Fig. 2, becomes, when the mechanism is assembled, a reservoir filled with liquor, whose presence in this place serves to reduce resistance to the movements of the paddles, as further explained hereinafter.

The two paddle wheels are similar. Each consists of a hub 48, from which extend arms 49 jointed at their extremities by rim portions 50; and the spaces 51, limited each by two diverging arms, one rim portion and a portion of the circumference of the hub, are pressed full of a material, such as fiber, paper pulp or prepared wood, which is not expanded or otherwise changed injuriously by immersion in the liquor utilized in the mechanism.

In each of the slots, as 52, between two parallel arms 49 a paddle 53 is inserted, fitting between the arms and also transversely in the paddle wheel chamber with a sliding-fit as accurate as is practicable. Each paddle consists of an integral piece of hard and tough metal, such as nickel-steel, formed with two cylindrical studs 54, as shown most clearly in Figs. 4 and 5, and each stud is preferably provided with a roller ring 55; these ringed studs fitting with all practicable accuracy in guide grooves 44, 45, 46 and 47 in such manner that the rings are caused to roll upon the inner or the outer wall of said grooves, when the paddle wheels are revolved; and the eccentric conformation of said grooves has the effect of holding each paddle within the circumference of the paddle wheel during one half of a revolution and of gradually forcing it out to receive impulsion from the moving liquor and gradually drawing it back into the paddle wheel again. At the interior end of each slot 52 a small open space 56 communicates directly with the central opening in dividing-plate 31, when the mechanism is assembled, so that liquor may be readily drawn into and expelled from the space between each paddle and the paddle wheel hub, when the paddles are successively drawn in and out in the slots; the total amount of liquor contained in the central opening and in the slots, combined, being approximately the same in all positions of the paddle wheel.

Those portions of the guide-grooves not occupied by the studs of the paddles are preferably filled with strips of felt or other flexible and elastic material adapted to be carried around by the revolving paddle wheel while filling the grooves and whatever small space there may be, by reason of inaccurate workmanship, between the sides of paddle wheels and the almost contiguous walls of the dividing-plate and of the cover-plates.

Any suitable means, well known in the art, may be adopted for fitting sections 4, 5 and 6 of the container-case tightly together. Throughout the mechanism the flange-joints are normally secured against leakage by the use of thin washers of fiber or soft metal, the surfaces of the joints being first ground perfectly plane and thinly coated with metallic paint. The joints between cover plates 42 and 43 and the edges of semi-circular ribs 39 and 40, respectively, should be sufficiently tight to permit no unnecessary dissipation of energy by communication between columns of liquor moving in opposite directions. To this end rills may be formed in the edges of said ribs and filled with packing thread, or any other equivalent provision may be adopted. The bolts passing through side plates 28 and 29 and the respective cover plates should preferably be driven tightly into the bolt holes in said side plates and secured against rotation by means of a flat edge on the bolt heads fitted against a rib cast on the interior of each side plate. The operation of the mechanism may now be understood.

When the screw wheel is revolved, and the switch tube is turned into the position shown in dotted lines in Fig. 1, registering with the upper port in the curved web, rearward pressure is exerted upon the liquor surrounding the separator - funnel and the switching device and is communicated through the lower port to the liquor in the paddle wheel chambers and to the paddles projecting into the lower portions of said chambers, and, if the pressure brought to bear upon the maximum projecting area of one paddle of each paddle wheel is sufficient, in proportion to the pressure wasted by reason of the more or less imperfect contacts of movable parts in the mechanism, movement of the liquor in solid column and rotation of the paddle wheels ensue, the liquor on the other side of each paddle being enabled to yield by reason of the simultaneous action of the spoke-blades of the screw wheel. This action should be so adjusted, in order to obtain the greatest efficiency of the mechanism and to avoid end thrust upon the bearings of the screw wheel shaft, that, especially at the highest desired rotary speed of the screw wheel, the rearward thrust from the circumferential blades and the forward thrust from the spoke-blades are substantially equal; a condition which may be attained in each case by careful proportioning of the areas and pitch of both sets of blades. In the measure as each paddle wheel rotates, the displaced liquor now follows the course through the upper channel of the paddle wheel casing, through the upper port in the curved web, through the switch tube and the openings in the switch shaft and switch base, into the separator-funnel and between the revolving spoke-blades to in front of the screw wheel, whence it is again sent rearward by the action described.

It is an essential feature in the preferred form of my invention that the screw wheel is of such construction, that liquor forced rearward is not able to return through the slower-moving central portion of the wheel without first moving the load. With this in view and for reasons of practical expediency I have chosen to effect the complete circulation of liquor by the specific construction illustrated in the accompanying drawing, but equal results, so far as mere dynamic efficiency is concerned, may be obtained by using a screw wheel consisting of a relatively large solid disk provided with relatively small circumferential blades and arranging for the completion of the circulation by an external tube. On the other hand, equal results may not be obtained by the use of a screw wheel designed in similarity with the ordinary marine propeller wheel, because, with a screw wheel of that description, the liquor in the mechanism would be able to escape from its work by returning to in front of the circumferential portions of the propeller blades between the same blades nearer the hub, where the thrust may be inferior to the resistance of the work.

Though I have not described in detail any application of my invention in which a relatively large disk with relatively small blades, in conjunction with a substantially external return tube and a suitable switch mechanism, is used, such construction comes within the scope of my invention, in so far as relates to the use of a screw wheel, or disk provided with blades, substantially embodying the qualities here referred to.

Reverting to the description of the preferred form of my invention, it is evident that the proportions between engine power, engine speed and the design and dimensions of screw wheel 9 may be so selected, that, in case of an overload, said screw wheel will still continue to be revolved at one speed or another.

By turning the switch tube, till it registers with the lower port, the direction of the rotation of the paddle wheels is reversed. By turning the switch tube into the intermediate position shown in full lines in Fig. 1, in which position it partly covers and partly uncovers both ports, rearward pressure exerted through the uncovered portions of the ports is balanced against opposing columns of liquor in the paddle wheel channel, so that the paddle wheels remain stationary, while the liquor flows freely back through the switch tube, with no more increased resistance than results from the diminished area of entrance to it; the middle portion of the mouth of said tube being covered, in that position, by that portion of curved web 25 separating the two ports. By turning the switch tube into positions intermediate between that shown in full lines and that shown in dotted lines in Fig. 1, an idle return for a portion of the liquor (through the switch tube, without passing around the paddle wheels) is provided, in varying degree, and the pressure brought to bear against the paddles in one direction through the lower port is offset by a smaller pressure in the opposite direction through the upper port. A portion of the power delivered by the screw wheel is consequently dissipated, and the movement of the load is retarded, in any desired degree, corresponding to the position given the switch tube; but the variations in the amount of power made available for the rotation of the paddle wheels are not proportionate to the variations in the angle of the switch tube, the substantially neutral position of said tube being much less sensitive to small variations of the angle than certain other portions of the tube's trajectory.

Certain details, relating mainly to the bearings of shafts, remain to be described. Hanger 8, which is an integral portion of section 1 of the container-case, is bored concentrically with the internal cylindrical wall of drum 57, in which the screw wheel revolves. The bore of said hanger is recessed at both ends, the recess at the exterior end being the longer one; both recesses are screw-threaded, the exterior one for only part of its length. Tubular member 58 is so formed that one end fits in the bore of the hanger and the other end fits closely in the unthreaded portion of the exterior recess, while the middle portion is reduced in diameter so as to leave a tube-shaped space between it and the bore of the hanger, and is provided with two belts of small perforations. The end portions of said tubular member 58 are recessed internally for the reception of the exterior races of ball-bearings 59. These ball-bearings are in all respects similar and may be of any well known annular design, which, as such, forms no part of my invention. The exterior end of shaft 7, which is shown as broken away in the drawing, is normally provided with means for coupling it to an engine shaft. Said shaft 7 is screw-threaded for the reception of nuts 60 and 61, 62 and 63 and 64 and 65, "left" thread being used at one end of the bearing mechanism and "right" thread at the other end, as well understood in the art. Nuts 60 and 61 are screwed against the shoulders formed by the enlarged middle portion 66 of the shaft and are formed with broad flanges 67 and 68, whose cylindrical circumferences fit loosely in the bore of tubular member 58, while the sleeve-portions of said nuts 60 and 61 form seats for the interior races of ball-bearings 59. The dimensions of the stationary and the revoluble parts of the bearing are so adjusted in comparison with the sizes of the ball-bearing rings, and the balls so adjusted to the latter, that the plain bearing between flanges 67, 68 and tubular member 58 does not enter into severe service as a load-supporting bearing, until the ball-bearings become worn or injured. For further protection against excessive wear, which might result in leakage through the bearing of the liquor in the container-case, the front face of tubular member 58 is provided with notches 69 (Fig. 6), so that, by the use of a spanner, said tubular member, together with the exterior races of the ball-bearings, may be rotated within the hanger; and said face of tubular member 58 is also marked, as a dial, with the initials of the calendar months in a manner enabling the operator or caretaker of the mechanism conveniently to observe that any given position of the non-revoluble portions of the bearing be maintained for only a certain, limited period of use; thereby securing distribution and diminution of wear of said fixed or non-revoluble bearing members.

Metallic washers 70 abut against the respective ends of tubular member 58 and the exterior races of the ball-bearings, and said washers are slightly thinned on the portion adjacent to the interior ball-bearing races, so as not to rub severely against them. Against these washers the nuts 71 and 72, one threaded "right" and the other "left," are screwed tightly home. The exterior faces of said nuts 71 and 72 are recessed to provide a secure seat for washers 73, which are of fiber, leather or similar material. After the spaces 74 have been packed firmly with a plastic, greasy substance, such as a mixture of tallow and graphite, the nuts 62 and 63 are screwed into moderately tight contact with washers 73 and secured by jam-nuts 64 and 65.

A screw-threaded aperture is formed in the upper portion of the hanger and is closed with screw-plug 75, except when used for the introduction of lubricant to the bearing. Said screw-plug may be formed as a set-screw impinging upon tubular member 58, to prevent accidental rotation of the latter.

Lubricant is introduced in the bearing, when the mechanism is first assembled, preferably as follows: After a small quantity of oil, about sufficient to one-half fill both ball-bearings, has been poured in, a tube is inserted in the hole in the hanger, and, by means of a loose-fitting rod a quantity of more consistent lubricant, such as tallow or grease mixed with graphite, is jammed into the mechanism. This substance spreads, under the pressure applied, in the tube-shaped space between the hanger and tubular member 58, enters through the perforations in the latter and gradually forces the oil into the annular ball-bearings. By turning the screw-wheel shaft and manipulating the jam-rod air is permitted to escape through the feed tube. When the resistance to further insertion of lubricant becomes noticeably increased, nuts 62 and 63 are slightly loosened, and the insertion is continued until oil appears at the edges of washers 73, when the nuts are again screwed into moderately tight contact with said washers, secured by jam nuts 64 and 65, respectively, and insertion of lubricant continued until resistance against rotation of the shaft becomes appreciably increased. The feed tube is then removed, and the screw-plug secured in the aperture, instead.

The bearings of switch shaft 21 may be made in any well known manner adapted to secure tightness, without much regard for friction and wear, as the rotary movement of the shaft is small and relatively infrequent. In the construction illustrated in Fig. 2, hanger 76 for shaft arm 22 is made by forming corresponding, semi-cylindrical, lateral extensions upon the walls of sections 2 and 3 of the container-case, with the flanges 77 and 78 of the said sections continued along the meeting-edges of the two semi-cylinders, so that the same may be joined, by bolts and nuts in the flanges, in the usual manner, and jointly threaded for the reception of screw-plug 79, while the interior portion of the hanger thus formed affords a bearing for the reduced end 80 of the shaft, with room for packing between the shaft end and the screw-plug.

The hanger for shaft arm 23 is formed by semi-cylindrical extensions upon the flattened walls of sections 2 and 3 of the container-case, in a manner similar to that just described, except that the diameter of the extensions is larger. The reduced end of the shaft arm is provided with a flange 81, and the space 82 is tightly packed, the screw-plug 83 fitting closely around the shaft end and being provided, if preferred, with a jam-nut (not shown) bearing against the end of the hanger to secure said screw-plug 83 against rotation when the switch mechanism is operated.

The shafts, shaft bearings and hangers of the two paddle wheels are similar. One of these shafts, 85, with bearings and hanger 86, is illustrated in Fig. 5, the shaft being shown in side view, excepting the end portion carrying the paddle wheel, said end portion being shown in section together with the key 87 securing it to the paddle wheel hub. The bearings and hanger are shown in section without indication of the surfaces behind the sectional plane. One end of shaft 85 is shown broken away, being the end which is coupled to the work by a universal joint or any other preferred means. Hanger 86 is bored concentrically with the upper portion of guide-groove 46 and is lined with the snugly fitting tubular member 88, the ends of which are recessed interiorly to afford close-fitting seats for the exterior races of ball-bearings 89, said ball-bearings being similar and of any well known annular construction, which forms no part of my invention.

The exterior middle portion of tubular member 88 is recessed so as to form an annular space between it and the bore of the hanger and is perforated so as to admit lubricant from said annular space to the bearings. Interiorly said perforated middle portion of tubular member 88 affords a plain cylindrical bearing for the enlarged middle portion of shaft 85; said bearing being slightly looser than the ball-bearings, so as not to enter into service until the ball-bearings may have become worn. The interior races of the ball-bearings are closely fitted to those portions of shaft 85 adjacent to the middle portion. Metallic washers 84 and 90, slightly thinned toward their respective centers, so as not to rub severely upon the interior races of the ball-bearings, are fitted in the hanger at the ends of tubular member 88, one of these ends being flush with the shoulder of a recess formed in the exterior end of the hanger and washer 90 being inserted in said recess, abutting against the shoulder. Washer 84 is ground to accurate contact with the contiguous face of the paddle wheel hub, similarly ground. That portion of the recess in the exterior end of the hanger not occupied by washer 90 is threaded for the reception of the flanged annular member 91, which is screwed tightly against said washer; and the exterior face of the flange of said annular member 91 is ground, in part, as an accurate plane, so as to maintain close contact with nut 92, when the latter is revolved with the shaft. Said nut 92 is similarly ground on both faces and is screwed upon the threaded portion of the shaft and secured in contact with annular member 91 by jam nut 93. The annular space 94, formed between the shaft and the members 90, 91 and 92, is packed with a suitable substance, such as tallow mixed with graphite. The annular member 91 is threaded interiorly to receive another threaded ring 95 provided with a planed interior face adapted to impinge upon the exterior face of nut 92; and the annular space 96, thereby formed, is packed similarly to space 94. A centrally apertured disk 97 is secured to the threaded exterior end of the hanger by a threaded flange and is drilled and tapped in one or more places for the reception of set-screws, 98, adapted to impinge upon ring 95 and prevent accidental rotation of the same. The upper portion of the hanger is provided with set-screw 99, which serves to hold tubular member 88, preventing undesired rotation, and the aperture occupied by said set-screw is utilized for the introduction of lubricant in the bearing.

Fluctuations of temperature may cause expansions and contractions of the metallic container-case in my invention, and these may not wholly correspond with simultaneous changes in the volume of the liquor therein. In order to avoid undesirable stresses arising from this cause, and also with the object of providing means for detecting leaks and obviating defective operation due to such leaks, I have devised the auxiliary mechanism illustrated in Fig. 7, in which the pipe 100 is a continuation, by any preferred means constituting a tubular connection of the required strength, of pipe 100 shown in Fig. 1. To pipe 100 is screwed the multiple pipe joint 101, into which are also received pipes 102, 103 and 104. The latter is provided with stop-cock 105 and air valve 106, adapted for admitting air under external pressure. Pipes 102 and 103 are threaded "right" at one end and "left" at the other, so that they may be screwed simultaneously into multiple pipe joint 101 and into the integral casting 107. Pipe 102 is provided with stopcock 108 and communicates with the reservoir for liquor 109, which is formed on casting 107 and provided with a screw-lid 110, in which there is a small air vent. Pipe 103 communicates with the bore of cylinder 111, which is an integral part of casting 107. Said cylinder 111 contains piston 112 with piston rod 113 and spiral spring 114. The port 115 communicates between the bore of cylinder 111 and reservoir 109. The piston rod 113 passes through a central aperture in screw-lid 116, which is provided with forked lug 117. Bolt 118, threaded at one end, is passed through slots formed in both forks of said lug and through a circular hole in lever 119. By means of nut 120 said lever may thus be pivoted at any desired point in said slot, so that it may bear down upon the top of piston rod 113 with more or less force, accordingly as bolt 118 is adjusted.

The weight 121, suspended from the free end of lever 119 is steadied by being loosely inclosed between the walls of a bore formed in casting 107. The operation of this auxiliary mechanism is as follows: It may be employed for filling the main mechanism with liquor by using reservoir 109 as a funnel, after removal of its screw-lid. During operation of the main mechanism said reservoir 109 is normally half-filled with liquor of the kind used in the main mechanism; the pipes 101, 102, 103 and 104 are all full, and the stop-cock on pipe 104, to the air valve, is turned off. The stop-cock on pipe 102 may also be left open, unless, through inaccuracy in design or workmanship, the spoke-blades of screw wheel 9 produce a pressure not wholly neutralized by the circumferential blades, in which case liquor is driven into reservoir 109, and the entrance of air in the container-case, through flaws in joints or bearings, is facilitated. The relative efficiency of the two screw-blade sets may thus be tested, to some extent, as for manufacturing purposes, by means of the auxiliary mechanism. If the tightness of the main mechanism is not perfect, leakage is rendered less probable by turning stop-cock 108 off. In that case, and when said stop-cock has been accidentally turned off, safety against pressure (caused, for example, by the sudden cooling of the container-case from the outside) depends upon the column of liquor in pipe 103 raising piston 112 and flowing into reservoir 109 through port 115. If it is desired to ascertain if leakage takes place, stop-cock 105 may be opened, after stop-cock 108 has been kept closed for some time, and, if air rushes in to fill a vacuum, the probability of leakage is established, though the cause may also be the expansion of the container-case without a corresponding, simultaneous expansion of the liquor.

In the foregoing description of my invention certain portions have been described as being "to the rear of" or "in front of" other portions, but it is evident that it is not essential to my invention whether it is placed in one direction or in the opposite in relation to the vehicle or other machinery to which it is applied.

The paddle wheels have been described as provided with six paddles each, but it is evident that my invention may be carried out with a greater or with a smaller number of paddles, though normally not with less than four; the number required for the efficiency of the mechanism depending upon the conformation of the guide-grooves, whose degree of eccentricity is determined, partly, by an arbitrary choice relating to the relative width and length of the paddles and, partly, by the consideration of a number of factors relating to their area and varying with the purposes for which the mechanism is intended.

It is also evident that my invention may be fully carried out with a single paddle wheel instead of two; for example, in the application to the driving of a motor bicycle or to the driving of machinery.

I have described a form of my invention adapted for transmitting power from an engine shaft to driven shafts placed substantially at right angles with said engine shaft, but it is evident that the invention may be applied to transmit power to one or more driven shafts occupying any desired stereometric relation to the engine shaft, such application involving no essential necessary changes in the mechanism, but only different forms of the container case, or the use of tubes, flexible or otherwise, connecting one or more separate paddle wheel cases with the ports in curved web 25.

It is not an essential feature that the paddles project from the paddle wheels in the lower half of the paddle wheel case, as in the application of my invention illustrated herewith. For example, the eccentric part of the guide-grooves may extend rearward instead of downward, and the semi-circular ribs 39 and 40 may extend from the front half of dividing-plate 31 instead of from the upper half.

I am aware that the application of ball-bearings to revolving shafts is not new, and that socalled oil-retaining ball-bearings have been made and used prior to my invention, and that plane-ground surfaces revolving in contact with other plane-ground surfaces have been employed for the purpose of securing retention of lubricant in bearing mechanisms; but it has heretofore been considered impracticable and useless to employ ball-bearings in bearing-mechanisms which were required to be perfectly fluid-tight, in the sense of preventing ingress and egress of fluid under pressure. Now, I have discovered the method described for rendering the employment of ball-bearings in such mechanisms practicable and useful. It is my discovery—upon which discovery this feature of my invention is based—that, partly by means of plain surface bearings, which may be parallel or conical, but which are shown in this instance as parallel, said plain bearings being made relatively loose and preferably thoroughly filled with a lubricating and tightening medium of high consistency, ball-bearings may be introduced in a bearing-mechanism required to be strictly fluid-tight with the effect of reducing wear of all parts of such mechanism (including the parts of the annular ball-bearings) to an heretofore unknown minimum, thereby securing permanency of tightness in combination with small frictional resistance in a degree heretofore unknown, and peculiarly adapted for rapidly revolving shafts.

In my invention, as a whole, the introduction of ball-bearings for shafts, along which no leakage must take place, serves, additionally and with equal importance in my conception of the invention, the purpose of maintaining those revoluble parts of the mechanism which are mounted upon said shafts in constant relations to fixed portions of the mechanism, thereby rendering possible a permanently accurate adjustment of said relations. I refer especially to the relations of the circumferential blades of the screw wheel to the interior wall of the drum in which said wheel revolves, and to the relations of the paddle wheel circumferences to the semi-circular ribs 39 and 40 and to the bottoms of the paddle wheel chambers. Manifestly, the accuracy of these relations safeguards the efficiency of the mechanism and is, in turn, safeguarded by the use of ball-bearings in the bearing-mechanisms for the respective shafts.

I claim as my invention, and desire to secure by Letters Patent:

1. In a hydraulic power transmission mechanism, a revoluble driving-wheel; upon the circumference of said wheel oblique or screw blades of small radial extension and low pitch, adapted for imparting motion to adjacent portions of an inclosed liquid mass in a direction substantially parallel with the axis of said driving-wheel; in said driving-wheel other oblique or screw blades constituting the spokes of said wheel and adapted for imparting motion to adjacent portions of the liquor contained in the mechanism in a direction substantially opposite to the motion produced by the circumferential blades.

2. In a hydraulic power transmission mechanism, in combination, within a container-case a revoluble wheel constructed and arranged to drive adjacent fluid in one direction externally of its rim and in the opposite direction interiorly of said rim; a separator-funnel impinging against said rim and separating the fluid driven in one direction from fluid driven in the opposite direction; a hollow stationary switch-base; a switch-tube fitted adjustably at one end in said switch-base and impinging adjustably with its other end against a web forming a partition in said container-case—the said funnel, switch-base and switch-tube, jointly, forming a continuous conduit from said rim of the driving-wheel to said web; two ports in said web, each port adapted to register with the opening of said switch-tube, accordingly to the position given said tube, and said ports in such mutual relation that the opening, or mouth, of said tube may cover either port wholly or both ports in part; beyond said ports a motor upon which the fluid in the mechanism may act; substantially as described.

3. In a hydraulic power transmission mechanism, a hollow revoluble driving wheel, a blade obliquely disposed upon the outer periphery thereof adapted to move an inclosed liquid mass in a direction substantially parallel with the axis of said wheel, another blade upon the inner periphery of the wheel obliquely disposed thereon in a direction opposite to the inclination of said first blade and adapted to move the liquid mass in a direction substantially opposite to the motion produced by said outer blade.

4. In a hydraulic power transmission mechanism, a driving shaft, a hollow revoluble driving wheel, an inclosing casing therefor, a plurality of blades obliquely disposed upon the outer periphery of said wheel adapted to move an inclosed liquid mass in a direction substantially parallel with said shaft, a plurality of other blades upon the inner periphery of the wheel obliquely disposed thereon in a direction opposite to the inclination of said first blades and adapted to move the liquid mass in a direction substantially opposite to the motion produced by said outer blades.

5. A hydraulic power transmission mechanism, a driving shaft, a revoluble driving wheel, an inclosing casing therefor filled with a liquid, a plurality of blades obliquely disposed upon the outer periphery of said wheel adapted to move the inclosed liquid in a direction substantially parallel with said shaft, a plurality of other blades upon the inner periphery of the wheel obliquely disposed thereon in a direction opposite to the inclination of said first blades and adapted to move the liquid in a direction substantially opposite to the motion produced by said outer blades; a bearing for the shaft at one end of the casing, said bearing comprising a ball bearing, a hanger therefor affixed to the casing inclosing said ball bearing and arranged to form a lubricant pocket adjacent to said ball bearing, an annular member affixed to the hanger, another annular member affixed to the shaft, said annular members having planed surfaces facing each other, and a packing between said annular members, said annular members and packing separating the ball bearing from the inside of the casing.

6. A hydraulic power transmission mechanism, a driving shaft, a revoluble driving wheel, an inclosing casing therefor, filled with a liquid, a plurality of blades obliquely disposed upon the outer periphery of said wheel adapted to move the inclosed liquid in a direction substantially parallel with said shaft, a plurality of other blades upon the inner periphery of the wheel obliquely disposed thereon in a direction opposite to the inclination of said first blades and adapted to move the liquid in a direction substantially opposite to the motion produced by said outer blades; a bearing for the shaft at one end of the casing, said bearing comprising two sets of ball bearings, a hanger therefor affixed to the casing inclosing said ball bearing, a sleeve within said hanger arranged to hold the ball bearings a fixed distance apart and to form a lubricant space between them, and lubricant pockets outside of the ball bearings, annular members affixed to the ends of the supporting member having outwardly facing planed surfaces, other annular members having inwardly facing planed surfaces adjustably affixed to the shaft, and packings between said annular members.

MARIUS C. KRARUP.

Witnesses:
   FRANK H. CLARK,
   JOHN KEFFER.